(12) United States Patent
Boudikian et al.

(10) Patent No.: US 10,328,845 B2
(45) Date of Patent: Jun. 25, 2019

(54) ELECTRICAL POWER SUPPLY FOR A LIGHTING DEVICE OF AN AUTOMOBILE VEHICLE COMPRISING A PLURALITY OF OUTPUTS

(71) Applicant: VALEO VISION, Bobigny (FR)

(72) Inventors: David Boudikian, Paris (FR); Sylvain Yvon, Mareuil (FR); Jean-Philippe Alves, Cormeilles en Parisis (FR); Irantzu Jauregi, Paris (FR); Souheil Mazzour, Paris (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/446,120

(22) Filed: Mar. 1, 2017

(65) Prior Publication Data

US 2017/0253173 A1    Sep. 7, 2017

(30) Foreign Application Priority Data

Mar. 1, 2016    (FR) ...................................... 16 51715

(51) Int. Cl.
| | |
|---|---|
| *H02M 1/00* | (2006.01) |
| *H02M 3/335* | (2006.01) |
| *B60Q 1/14* | (2006.01) |
| *B60Q 1/48* | (2006.01) |
| *H05B 33/08* | (2006.01) |

(52) U.S. Cl.
CPC ............. *B60Q 1/1415* (2013.01); *B60Q 1/48* (2013.01); *H02M 3/33561* (2013.01); *H05B 33/0812* (2013.01); *H05B 33/0815* (2013.01); *H05B 33/0845* (2013.01); *B60Q 2400/30* (2013.01); *H02M 2001/009* (2013.01); *Y02B 20/346* (2013.01)

(58) Field of Classification Search
CPC ... B60Q 1/1415; B60Q 1/48; H02M 3/33561; H05B 33/0812; H05B 33/0815
See application file for complete search history.

(56) References Cited

U.S. PATENT DOCUMENTS

| | | |
|---|---|---|
| 2004/0075393 A1 | 4/2004 | Ito et al. |
| 2005/0269968 A1 | 12/2005 | Ito et al. |

(Continued)

OTHER PUBLICATIONS

Julio C Rosas-Caro, Jonathan C. Mayo-Maldonado, Rene Fabian Vazquez-Bautista, Antonio Valderrabano-Gonzalez, Ruben Salas-Cabrera, Jesus Elias Valdez-Resendiz, "Hybrid Voltage-Multipliers Based Switching Power Converters", 2011, IAENG Transactions on Engineering Technologies vol. 6, p. 29-43.*

(Continued)

*Primary Examiner* — Dedei K Hammond
*Assistant Examiner* — Raymond R Chai
(74) *Attorney, Agent, or Firm* — Oblon, McClelland, Maier & Neustadt, L.L.P.

(57) ABSTRACT

A device that provides a circuit for controlling the power supply of a plurality of groups of light sources, preferably of the light-emitting diodes type, which perform a plurality of lighting functions for an automobile vehicle. The device is noteworthy in that it enables a primary output voltage and several high-voltage secondary outputs to be produced, corresponding to the power supply requirements of the various groups of light sources, with the use of a single switch-mode converter circuit.

12 Claims, 10 Drawing Sheets

(56) References Cited

U.S. PATENT DOCUMENTS

| | | | | |
|---|---|---|---|---|
| 2010/0283322 A1* | 11/2010 | Wibben | ................ | H02M 3/158 307/31 |
| 2010/0295472 A1* | 11/2010 | Wibben | ................ | H02M 3/158 315/294 |
| 2012/0025722 A1* | 2/2012 | Mokry | ............... | H05B 33/0815 315/187 |
| 2012/0086336 A1* | 4/2012 | Tanaka | ............... | H05B 33/0815 315/82 |
| 2013/0119875 A1* | 5/2013 | Dearborn | ........... | H05B 33/0815 315/186 |
| 2015/0289331 A1* | 10/2015 | Chen | ................. | H05B 33/0815 315/186 |
| 2017/0231045 A1* | 8/2017 | Hu | ..................... | H05B 33/0845 |

OTHER PUBLICATIONS

Preliminary Search Report dated Nov. 9, 2016 in French Patent Application No. FR 1651715 (with English translation of categories of cited documents).

* cited by examiner

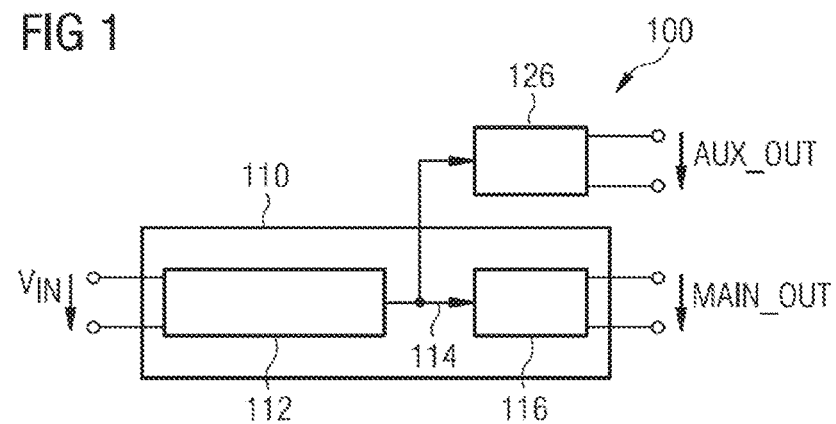
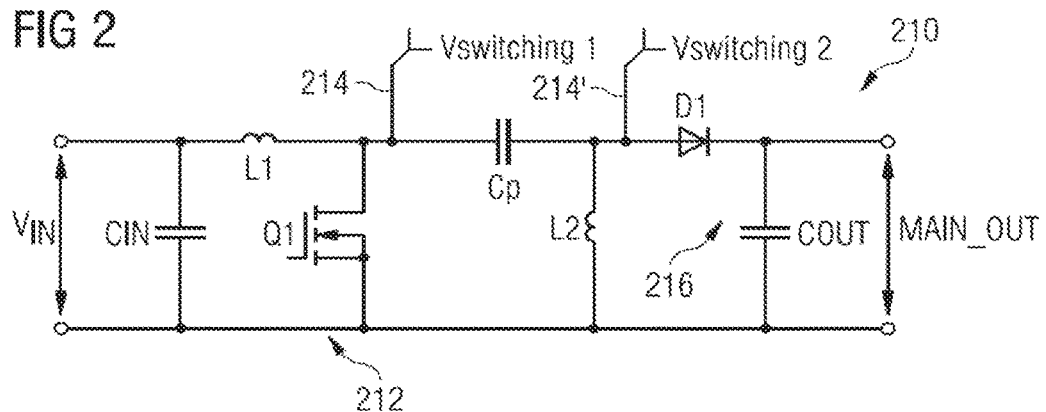
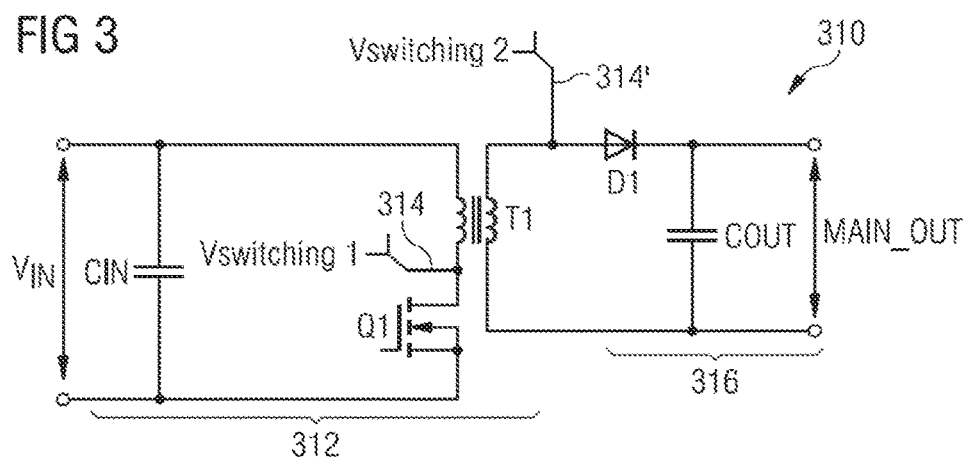

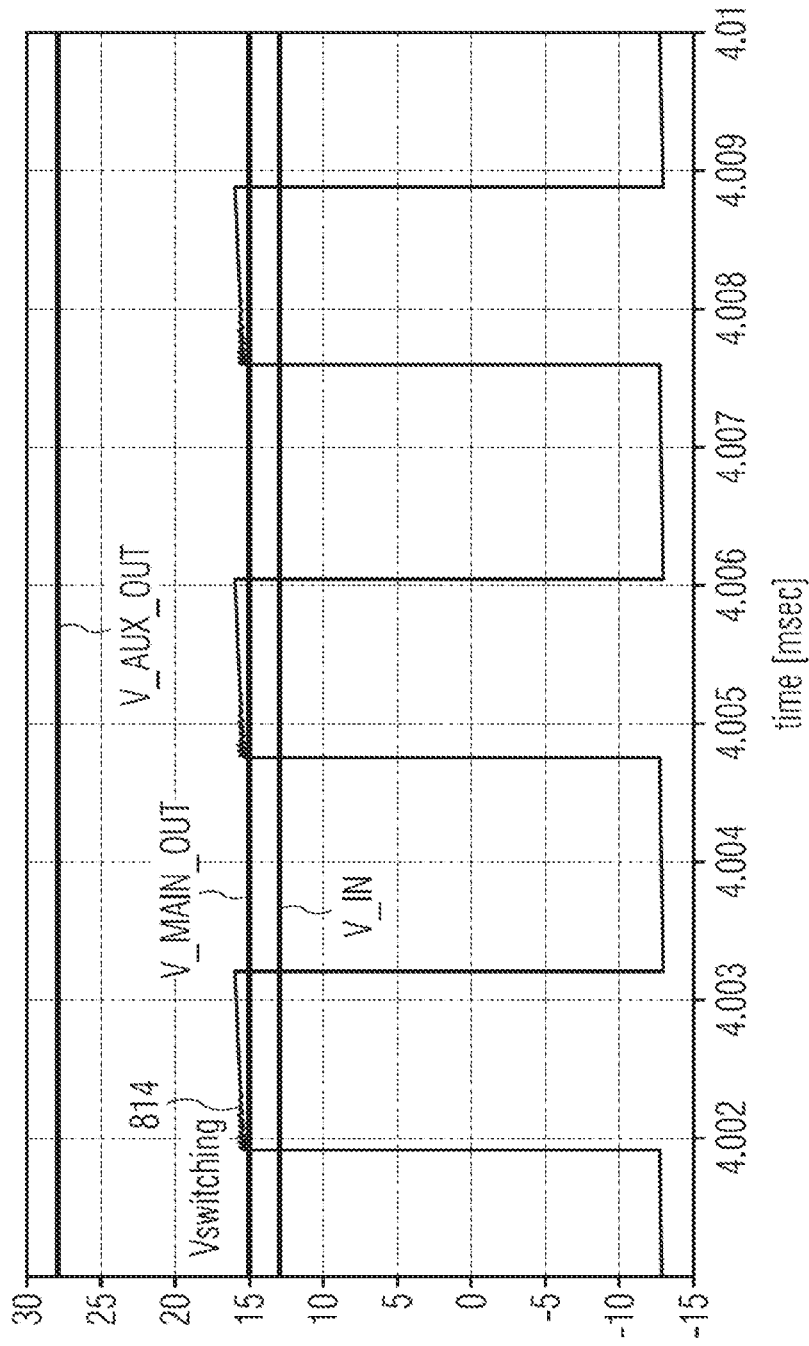

ELECTRICAL POWER SUPPLY FOR A LIGHTING DEVICE OF AN AUTOMOBILE VEHICLE COMPRISING A PLURALITY OF OUTPUTS

The invention relates to the field of devices for controlling the electrical power supply of light sources, more particularly in the field of automobile vehicles.

It is becoming increasingly common to use light sources with semiconductor elements, such as light-emitting diodes, or LEDs, in order to implement various lighting functions of an automobile vehicle. These functions may for example include daytime lights, side lights, the direction indicators or low-beam headlamps. In a known manner, a device for controlling the electrical power supply is necessary for powering a group of LEDs performing a given lighting function. Such a control device comprises, in general, a voltage converter which, starting from an input DC voltage supplied by a source internal to the vehicle, such as a battery, is capable of generating an output voltage with a value suitable for the power supply of the group of LEDs. A LED emits light when a voltage of at least a threshold value, called direct voltage, is applied to its terminals.

Known converters include converters of the SEPIC (Single-Ended Primary Inductor Converter), Flyback, voltage step-up ("boost") or voltage step-down ("buck") type. Such converters involve the use of a switching element, such as a transistor, whose state is periodically switched between the open and closed values. The chopping frequency applied to the switch influences the value of the output voltage.

As different lighting functions require different light intensities, it goes without saying that the supply voltage and current requirements vary between the various lighting functions carried out by a lighting device of an automobile vehicle. In order to meet these needs, a known solution is to provide multiple converter circuits, each converter circuit generating one of the required output voltages and current. This solution is however costly and leads to a significant loss of space in the limited environment of a lighting device for an automobile vehicle. Alternatively, a known solution is to operate a given converter in two different modes, in alternation, according to the principle of time sharing. This solution however requires a complex control circuit and may be detrimental to the lifetime of the light sources being powered.

The aim of the invention is to overcome at least one of the problems posed by the prior art. More precisely, the aim of the invention is to provide a device for controlling the electrical power supply which, by means of a single switch-mode converter circuit, allows power supply outputs to be implemented with several voltage levels.

The subject of the invention is a device for controlling the electrical power supply of at least two groups of light sources of an automobile vehicle, comprising a switch-mode voltage converter circuit, said converter circuit comprising means designed to generate a switched voltage signal starting from an input DC voltage. The device comprises primary output means designed to convert said switched voltage signal into an output DC voltage having a first voltage level and intended to power a first group of light sources. The device is noteworthy in that it comprises secondary output means designed to convert said switched voltage signal into at least a second output DC voltage having a second voltage level and intended to power a second group of light sources.

Preferably, the at least two groups of light sources can perform at least two separate lighting functions for an automobile vehicle.

The voltage requirement of the first group of light sources can preferably be lower than the second voltage level.

The second voltage level can preferably be higher than first voltage level.

The secondary output means can preferably comprise an electronic circuit comprising capacitors and diodes. Preferably, the secondary output means can comprise an electronic circuit which does not comprise any switching element and/or integrated circuit and/or microcontroller element. Preferably, the secondary output means can comprise an electronic circuit which is composed of capacitors and diodes, and optionally of resistors.

Preferably, the secondary output means can produce several output DC voltages starting from the switched voltage signal, the levels of these output voltages being higher than the first voltage level.

The switched signal can preferably alternate between two different voltage values.

Preferably, one of the two voltage values can be zero.

The converter circuit can preferably be a switch-mode converter, notably a circuit of the SEPIC, flyback, voltage step-down (buck) or voltage step-up (boost) type The converter circuit can preferably comprise a first part which generates a switched voltage signal.

The converter circuit can preferably comprise a switching element performing the voltage chopping function, which would preferably be a transistor. The secondary output means can preferably convert the switched signal which is generated on the drain terminal of the transistor. Alternatively, the secondary output means may convert a switched signal which is implemented on the anode of a diode of the converter circuit.

Preferably, the secondary output means can comprise linear means for regulating the output electrical current.

Another subject of the invention is a lighting device for an automobile vehicle comprising at least two groups of light sources generating at least two different light beams. The lighting device is noteworthy in that it comprises a device according to the invention for controlling the electrical power supply of the two groups of sources.

Preferably, the two light beams can perform different regulation photometric functions. Alternatively, the two light beams may participate in performing the same regulation photometric function.

Preferably, a first group of light sources, performing all or part of a first lighting function, can be powered by the first output voltage. At least a second group of light sources, performing all or part of a second lighting function, can be powered by a second output voltage of the device according to the invention.

The lighting functions can preferably comprise the position lights and low-beam headlamps functions.

Preferably, the light sources can comprise light-emitting diodes (LEDs), power diodes, or laser diodes.

By using the measures according to the present invention, it becomes possible to electrically power groups of light sources performing various lighting functions, and requiring different electrical voltages, by means of a single switch-mode converter. The provision of at least one additional output with a higher voltage than the main output voltage of the switch-mode converter allows an enhanced flexibility in the design of lighting devices for automobile vehicles. As the solution provided by the invention only involves the use of simple electronic components and electronic circuits of low complexity, its cost of production is low. Compared with existing solutions, the solution provided allows a reduction in the space needed by devices for controlling the power supply of several groups of light sources requiring outputs at different voltages.

Other features and advantages of the present invention will be better understood with the aid of the exemplary description and of the drawings, amongst which:

FIG. 1 illustrates schematically a device for controlling the electrical power supply according to the invention in one preferred embodiment;

FIG. 2 shows one example of a converter circuit of the SEPIC type, such as it operates in one preferred embodiment of the invention;

FIG. 3 shows one example of a converter circuit of the flyback type, such as it operates in one preferred embodiment of the invention;

Figure 6A:
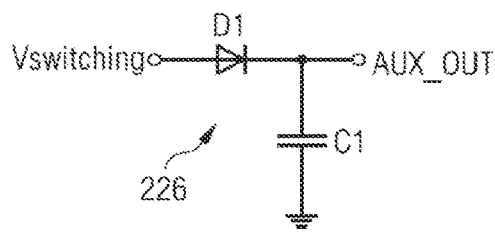
FIG. 6a shows one example of a circuit fulfilling the role of the secondary output means in one preferred embodiment of the invention.
Figure 6B:
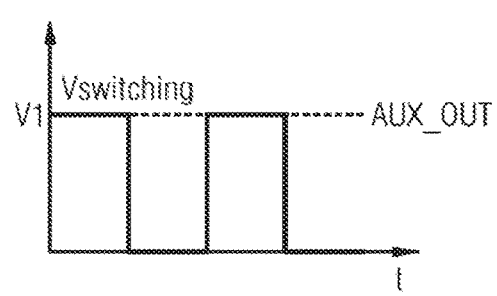
Figure 7A:
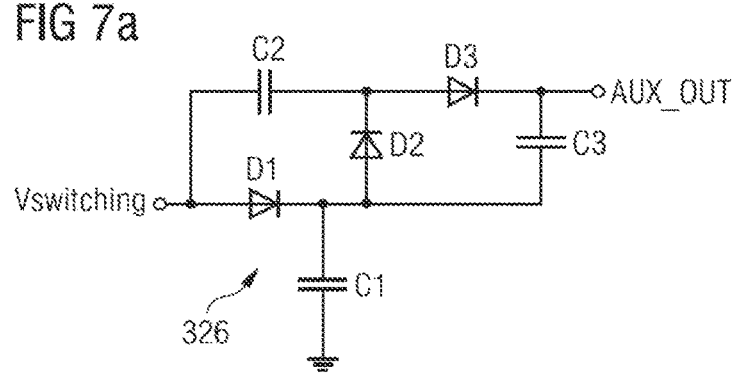
Figure 7B:
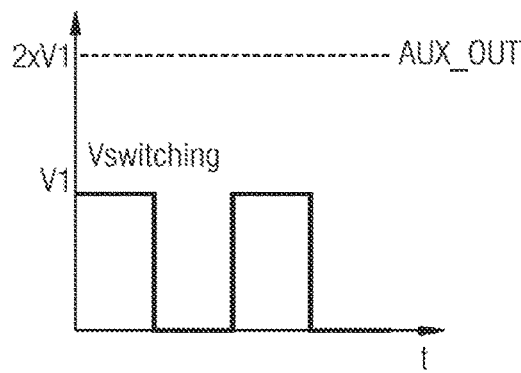
Figure 8A:
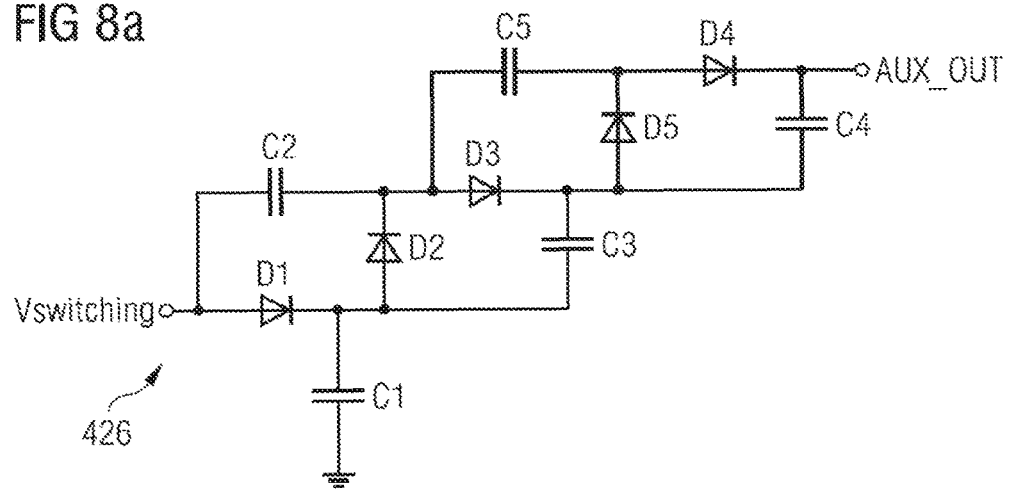
Figure 8B:
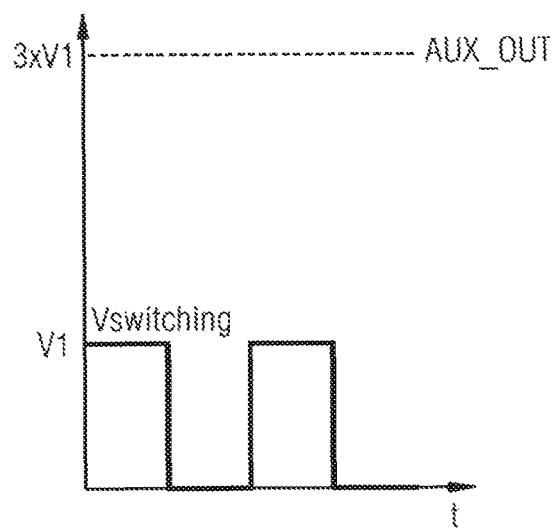
Figure 9A:
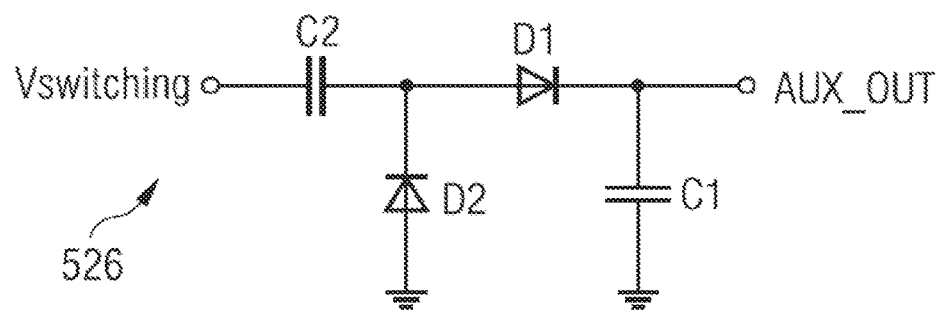
Figure 9B:
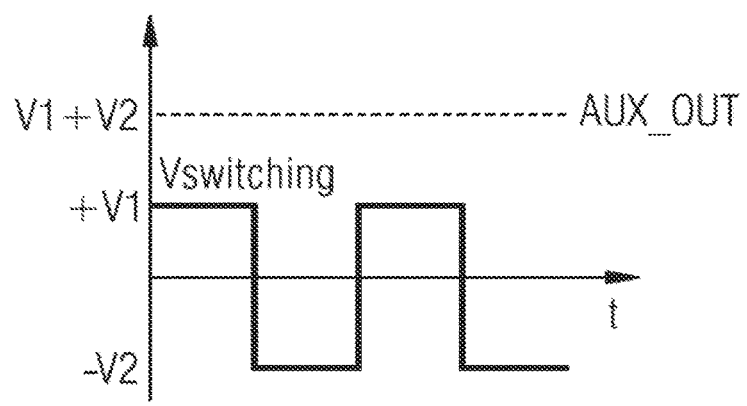
Figure 10A:
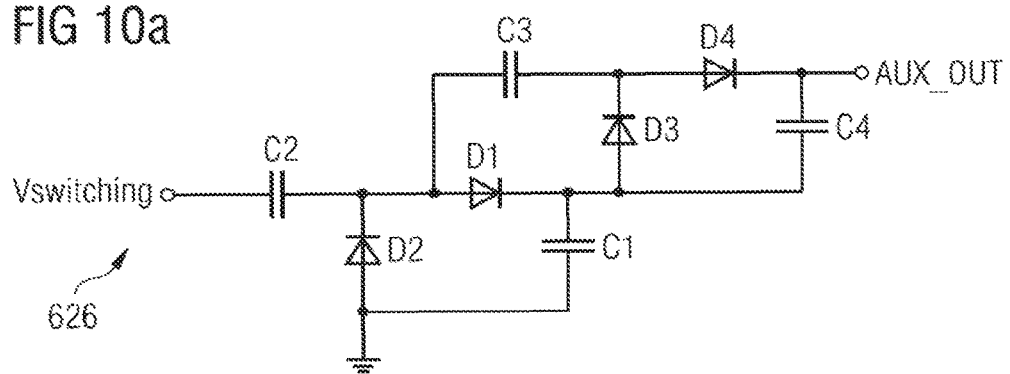
Figure 10B:
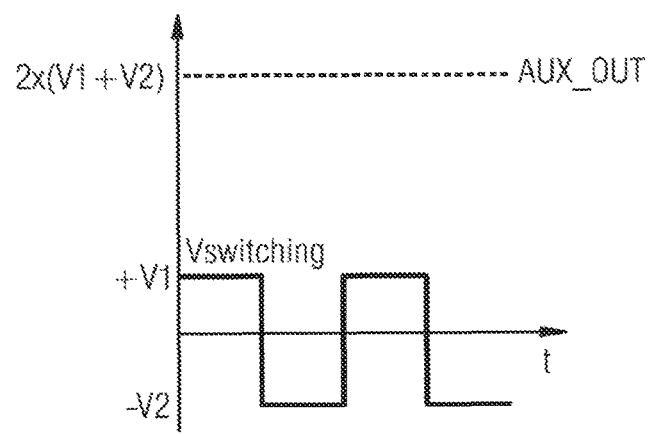
Figure 11A:
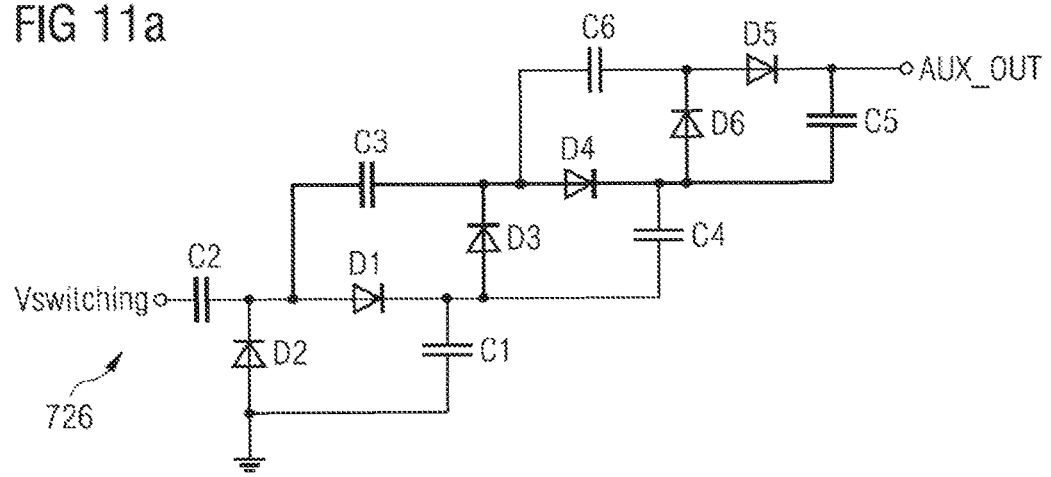
Figure 11B:
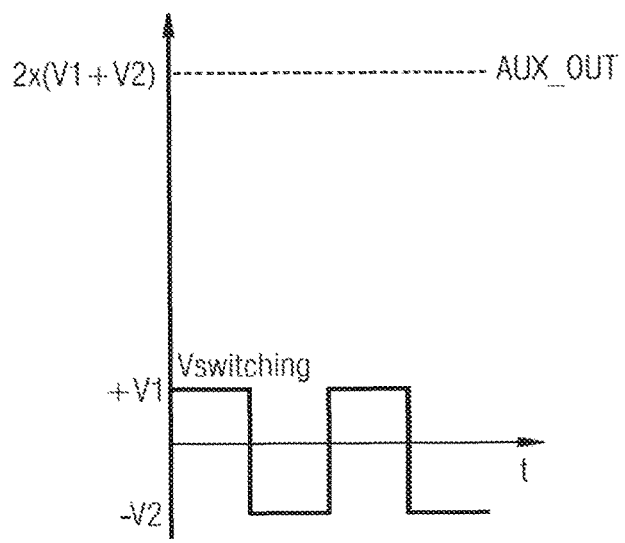
Figure 12A:
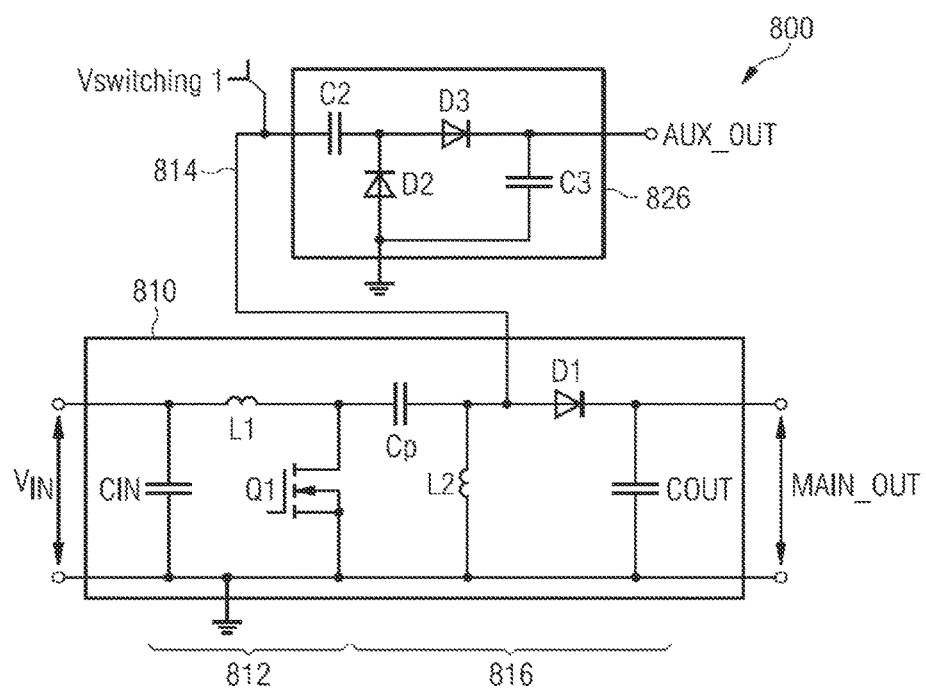
Figure 13:
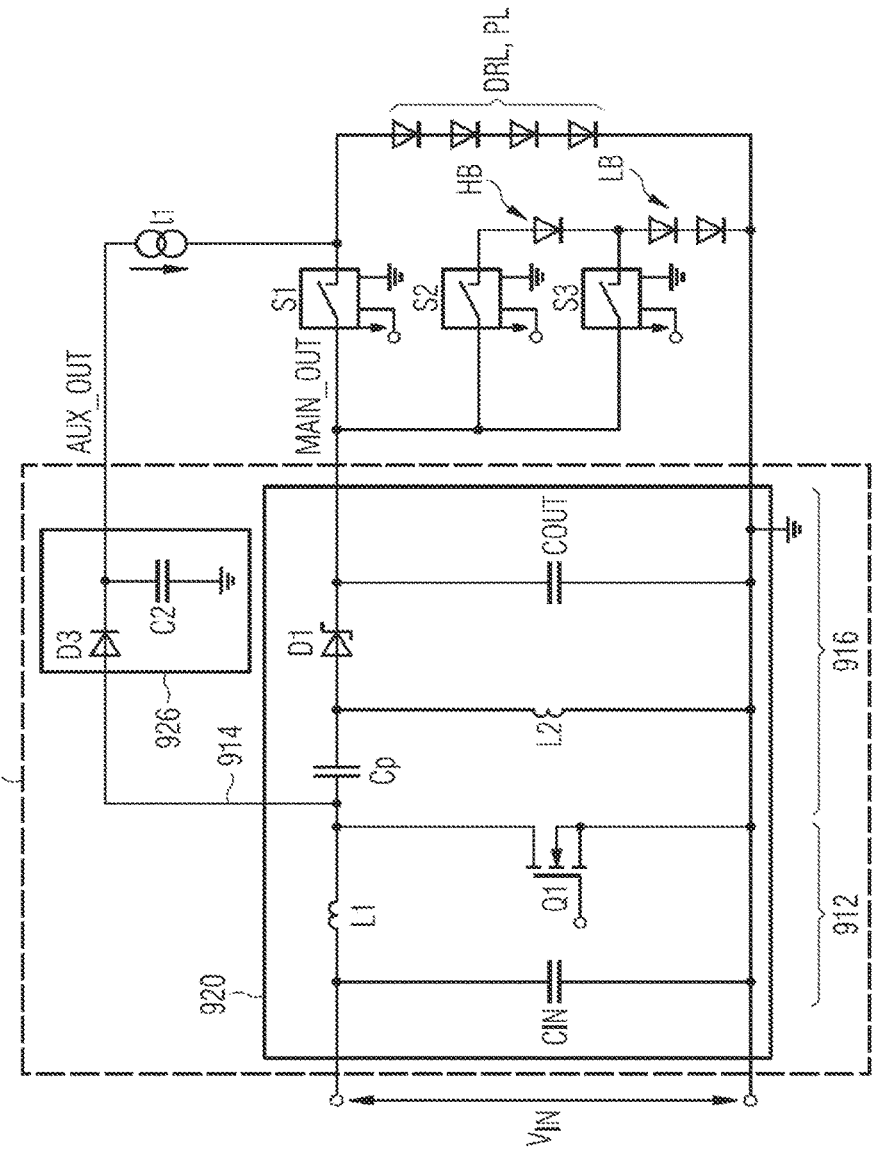

FIG. 6b indicates the behavior of the output voltage generated by means of the circuit in FIG. 6a given a switched input voltage signal;

FIG. 7a shows one example of a circuit fulfilling the role of secondary output means in one preferred embodiment of the invention;

FIG. 7b indicates the behavior of the output voltage generated by means of the circuit in FIG. 7a given a switched input voltage signal;

FIG. 8a shows one example of a circuit fulfilling the role of secondary output means in one preferred embodiment of the invention;

FIG. 8b indicates the behavior of the output voltage generated by means of the circuit in FIG. 8a given a switched input voltage signal;

FIG. 9a shows one example of a circuit fulfilling the role of secondary output means in one preferred embodiment of the invention;

FIG. 9b indicates the behavior of the output voltage generated by means of the circuit in FIG. 9a given a switched input voltage signal;

FIG. 10a shows one example of a circuit fulfilling the role of secondary output means in one preferred embodiment of the invention;

FIG. 10b indicates the behavior of the output voltage generated by means of the circuit in FIG. 10a given a switched input voltage signal;

FIG. 11a shows one example of a circuit fulfilling the role of secondary output means in one preferred embodiment of the invention;

FIG. 11b indicates the behavior of the output voltage generated by means of the circuit in FIG. 11a given a switched input voltage signal;

FIG. 12a shows one preferred embodiment of a device for controlling the power supply according to the invention;

FIG. 12b indicates the first and second output voltage levels generated by means of the device in FIG. 12a, together with the behavior of the switched voltage signal;

FIG. 13 shows one preferred embodiment of a lighting device according to the invention for an automobile vehicle.

In the description that follows, similar reference numbers will be used to describe similar concepts throughout the different embodiments of the invention. Thus, the numbers 100, 800 and 900 describe a device for controlling the electrical power supply in three different embodiments according to the invention.

Unless the contrary is specifically indicated, technical characteristics described in detail for a given embodiment may be combined with the technical characteristics described in the context of other embodiments described by way of non-limiting example.

Elements well known in the prior art relating to the operation of a device for controlling the electrical power supply of a lighting device for automobile vehicles, and not having any direct impact with respect to the present invention, will not be described in detail in the framework of the present description for the sake of clarity of the description.

FIG. 1 shows schematically the architecture provided according to a first preferred embodiment. A device 100 for controlling the electrical power supply of at least two groups of light sources for an automobile vehicle is shown. The light sources may be, but are not limited to, light-emitting diodes (LEDs). The device comprises a switch-mode voltage converter circuit indicated by the reference number 110. The converter circuit 110 is designed to convert an input voltage $V_{IN}$ into a primary output voltage MAIN_OUT given the presence of suitable means 112 that generate a switched voltage signal 114, and primary output means 116 which convert the switched voltage signal into a DC voltage with a value different from $V_{IN}$. The first output level MAIN_OUT is intended to power a first group of light sources, whose electrical voltage requirement is lower than the secondary output level AUX_OUT. This may for example be a group of light sources performing the low-beam headlamp' lighting function. The device 100 also comprises secondary output means 126 which convert the switched voltage signal 114, received within the converter circuit 110, into a second output voltage AUX_OUT higher than the voltage MAIN_OUT. Several outputs AUX_OUT at different voltages may be produced by means of the secondary output means 126 without however straying from the scope of the present invention. The secondary output means do not involve the use of switching elements, but only capacitors and diodes, thus limiting the complexity of the solution provided.

Various embodiments of the converter circuit 110 and also of the secondary output means 126 may be envisioned. Preferred embodiments of these components will be described by way of non-limiting example in the following, and with the aid of FIGS. 2 to 11. The various embodiments are numbered by incrementing the hundred numbers when going from one embodiment to the other. Thus, the converter circuit 110 in the architecture in FIG. 1 may be formed by the converters 210, 310, 410, etc.

FIG. 2 shows a circuit diagram of a converter 210 of the SEPIC type. The SEPIC converter, which is an acronym for "single ended primary inductor converter", is a switch-mode power supply used to convert a first DC voltage $V_{IN}$ into a second DC voltage MAIN_OUT, with a different value, either higher or lower than the first DC voltage. The value of the output voltage depends on the duty cycle of closing of the switch Q1, shown here as a transistor, for example of the MOSFET type. When the switch is open, the two inductors L1 and L2 supply the charging circuit with current through the diode D1. When the switch is closed, the voltage source charges the inductor L1, whereas the first capacitor Cp charges the second inductor L2. The charging circuit of is then supplied with current by the second capacitor COUT. It is also possible to replace the two inductors L1 and L2 by two inductors coupled in the same magnetic circuit.

A first part 212 of the converter generates a switched voltage signal 214, which, in the device according to the invention, is received by the secondary output means described above on the drain terminal of the transistor Q1. When the values of the inductors L1 and L2 are identical, the signal 214 alternates between the voltage levels MAIN_OUT+$V_{IN}$ and 0. Alternatively, the secondary output means may receive the switched voltage signal 214' on the anode of the diode D1. This signal 214' alternates between the voltage levels MAIN_OUT and −$V_{IN}$. A second part 216 of the converter generates the DC voltage level MAIN_OUT.

FIG. 3 shows a circuit diagram of a converter 310 of the flyback type. The flyback converter comprises a transformer T1 in the form of coupled inductors. The primary transformer is characterized by a number of turns n1, whereas the number of turns on the secondary transformer is given by n2. A first part 312 of the converter generates a switched voltage signal 314, which, in the device according to the invention, is received by the secondary output means described above on the drain terminal of the transistor Q1. The signal 314 alternates between the voltage levels (n2/n1)MAIN_OUT and 0. Alternatively, the secondary output means may receive the switched voltage signal 314' on the anode of the diode D1. This signal 314' alternates between the voltage levels MAIN_OUT and −(n2/n1) $V_{IN}$. A second part 316 of the converter generates the DC voltage level MAIN_OUT.

Figure 4:
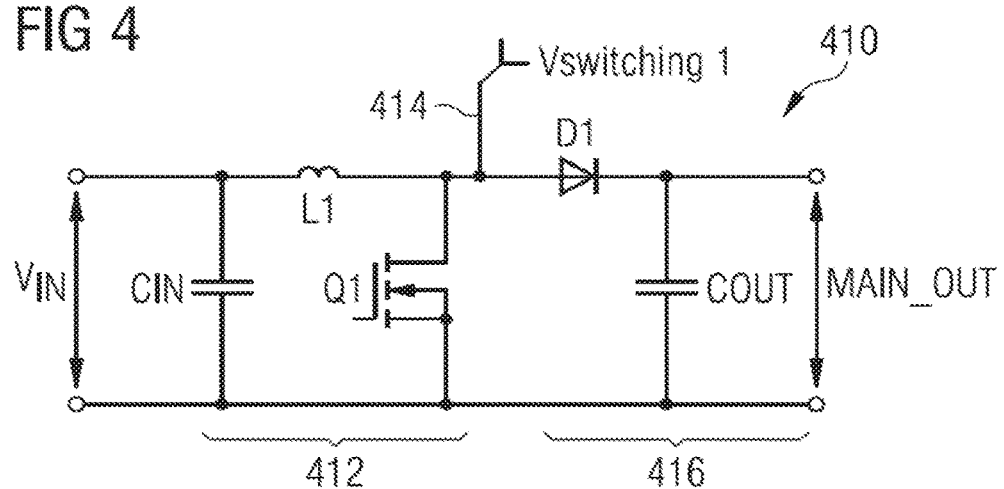
FIG. 4 shows one example of a converter circuit of the boost type, such as it operates in one preferred embodiment of the invention.

FIG. 4 shows a circuit diagram of a converter 410 of the voltage step-up, or boost, type. A first part 412 of the converter generates a switched voltage signal 414, which, in the device according to the invention, is received by the secondary output means described above on the drain terminal of the transistor Q1. The signal 414 alternates between the voltage levels MAIN_OUT and 0. A second part 416 of the converter generates the DC voltage level MAI N_OUT.

Figure 5:
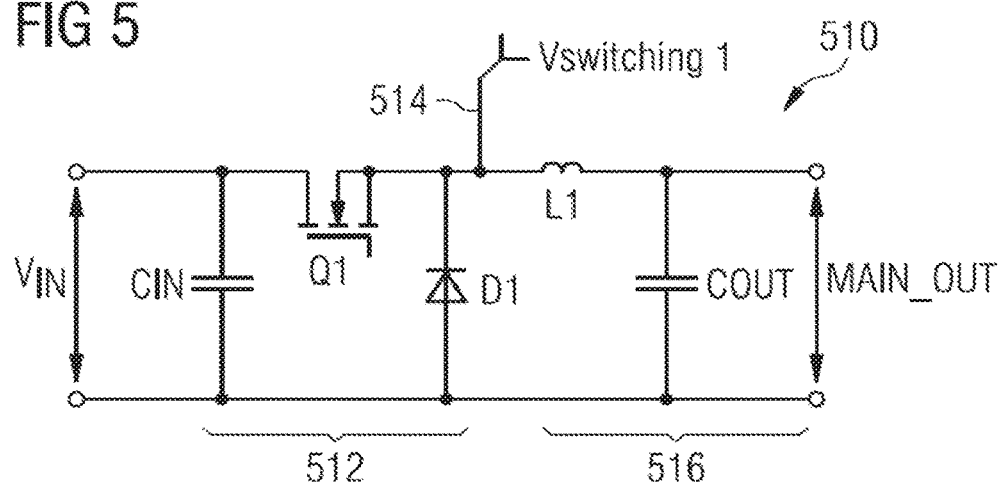
FIG. 5 shows one example of a converter circuit of the buck type, such as it operates in one preferred embodiment of the invention.

FIG. 5 shows a circuit diagram of a converter 510 of the voltage step-down, or buck, type. A first part 512 of the converter generates a switched voltage signal 514, which, in the device according to the invention, is received by the secondary output means described above on the drain terminal of the transistor Q1. The signal 514 alternates between the voltage levels $V_{IN}$ and 0. A second part 516 of the converter generates the DC voltage level MAIN_OUT.

FIGS. 6 to 11 illustrate examples of electronic circuits which perform the function of the secondary output means 126 of the architecture shown in FIG. 1. The reference "Vswitching" indicates the input signal of the secondary output means, which corresponds to the switched voltage signal generated by the converter circuit. FIGS. 6a-8a are examples of circuits 226, 326, 426 designed to be used when the switched voltage signal received within the converter circuit alternates between a first non-zero voltage value and the value 0. FIGS. 6b-8b give the behavior and the value of the second output voltage able to be generated by means of the respective circuits. It goes without saying that other electronic circuits may be envisioned and are accessible to those skilled in the art, without however straying from the scope of the present invention. The specific implementation depends on the requirements of applications, notably in terms of actual values of electrical voltages required.

Similarly, FIGS. 9a-11a are examples of circuits 526, 626, 726 designed to be used when the switched voltage signal received within the converter circuit alternates between a first positive voltage value and a second negative voltage value. FIGS. 9b-11b give the behavior and the value of the second output voltage able to be generated by means of the respective circuits. It goes without saying that other electronic circuits may be envisioned and are accessible to those skilled in the art, without however straying from the scope of the present invention.

One example of a combination between a converter circuit such as has just been described and an electronic circuit fulfilling the role of the secondary output means such as have just been described is illustrated by way of non-limiting example in FIG. 12a. The device for controlling the power supply of light sources 800 comprises a converter circuit 810 of the SEPIC type. A first part 812 of the converter circuit generates a switched voltage signal 814 on the anode of the diode D1. A second part 816 of the converter circuit converts the signal 814 into a primary output DC voltage MAIN_OUT. By way of example, the input voltage of the converter 810 is equal to $V_{IN}$=13.5V. The switched voltage signal 814 alternates between the value MAIN_OUT (15V) and the value −$V_{IN}$. This signal is received as input of the secondary output means 826, which produce a second high voltage output level AUX_OUT at 28.5V, equivalent to $V_{IN}$+MAIN_OUT. The variation over time of the respective voltage signals are illustrated on the graph in FIG. 12b.

FIG. 13 shows one example of a lighting device for an automobile vehicle comprising a device for controlling the electrical power supply 900 of several groups of light sources with semiconductor elements according to the invention. The converter circuit 910 comprises a first part 912 which generates a switched voltage signal 914, together with a second part 916 which, starting from the switched voltage signal 914, generates the primary output voltage level MAIN_OUT. The switched voltage signal 914 is received by the secondary output means 926, which convert it into a secondary output voltage level AUX_OUT. The secondary output is complemented by a linear current regulator I1. The device 900 illustrated notably allows, by means of a single converter circuit 910, three separate groups of light sources of an automobile vehicle, carrying out a plurality of lighting functions, to be powered. A first group of light sources indicated by LB performs the low-beam headlamp function. A second group of light sources, HB, performs the high-beam headlamp function. A third group of light sources, DRL/PL, performs the daytime running lights function or position lights function depending on the intensity of the electrical current flowing through this group of light sources. A plurality of switches S1, S2, S3 governs the connection of the various groups of light sources to the load of the device 910. The switches are controlled in a known manner by a microcontroller element non-illustrated and programmed for this purpose.

In daytime lights mode of operation, the switch S1 is closed, S2 is closed and S3 is open. The linear current regulator I1 is not running and the group DRL/PL is powered by the output MAIN_OUT.

In low-beam headlamps and position lights (LB+PL) mode of operation, the switch S3 is closed, whereas S1 and S2 are open and the linear current regulator I1 connects AUX_OUT to the branch for DRL/PL light sources. The position lights function is powered by the secondary output of the device 900, whereas the low-beam headlamps function is powered by the primary output MAIN_OUT.

In low-beam headlamps and high-beam headlamps and position lights (LB+HB+PL) mode of operation, the switch S2 is closed, whereas S1 and S3 are open and the linear current regulator I1 connects AUX_OUT to the DRL/PL sources branch. The position lights function is powered by the secondary output of the device 900, whereas the combined low-beam headlamps/high-beam headlamps function is powered by the primary output MAIN_OUT.

With the aid of the description that has just been presented, those skilled in the art will know how to carry out other implementations providing the effect that has just been described, without however straying from the scope of the invention which is defined by the coverage of the appended claims.

The invention claimed is:

1. A device for controlling an electrical power supply of at least two groups of light sources for an automobile vehicle, the device comprising:
   a switch-mode voltage converter circuit designed to
      generate a switched voltage signal starting from an input DC voltage,
      convert said switched voltage signal into an output DC voltage having a first voltage level, and
      power a first group of light sources that perform a low-beam headlamp function or a high-beam headlamp function of the automobile vehicle; and
   an output device that is connected to the switch-mode voltage converter circuit and comprises an electronic circuit including capacitors and diodes, without including a switch, the output device designed to
   convert said switched voltage signal generated at the switch-mode voltage converter circuit into at least a second output DC voltage having a second voltage level, and
   power a second group of light sources that perform a position light function of the automobile vehicle, without performing the low-beam headlamp function or the high- beam headlamp function.

2. The device according to claim 1, wherein the second voltage level is higher than the first voltage level.

3. The device according to claim 1, wherein the output device comprises the electronic circuit including the capacitors and the diodes, without including the switch, an integrated circuit, and a microcontroller.

4. The device according to claim 1, wherein the output device produces several output DC voltages starting from the switched voltage signal, the levels of the output voltages being higher than the first voltage level.

5. The device according to claim 1, wherein said switched voltage signal alternates between two different voltage values.

6. The device according to claim 5, wherein one of the two different voltage values is zero.

7. The device according to claim 1, wherein the switch-mode voltage converter circuit is a circuit of a Single-Ended Primary Inductor Converter (SEPIC), flyback, voltage step-down or voltage step-up type.

8. The device according to claim 1, wherein the output device comprises a linear regulator to regulate an output electrical current.

9. The device according to claim 1, wherein the output device, which does not include the switch, is directly connected to the switch-mode voltage converter circuit.

10. A lighting device for an automobile vehicle, the lighting device comprising:
    at least two groups of light sources producing at least two different light beams; and
    a device for controlling an electrical power supply of the at least two groups of light sources, the device including
       a switch-mode voltage converter circuit designed to
          generate a switched voltage signal starting from an input DC voltage,
          convert said switched voltage signal into an output DC voltage having a first voltage level, and
          power a first group of light sources that perform a low-beam headlamp function or a high-beam headlamp function of the automobile vehicle, and
       an output device that is connected to the switch-mode voltage converter circuit and comprises an electronic circuit including capacitors and diodes, without including a switch, the output device designed to
          convert said switched voltage signal generated at the switch-mode voltage converter circuit into at least a second output DC voltage having a second voltage level, and
          power a second group of light sources that perform a position light function of the automobile vehicle, without performing the low-beam headlamp function or the high-beam headlamp function.

11. The lighting device according to claim 10, wherein the first and second group of light sources comprise light-emitting diodes, power diodes, or laser diodes.

12. The lighting device according to claim 10, wherein the second voltage level is higher than the first voltage level, and
    the output device comprises a linear regulator to regulate an output electrical current.

* * * * *